United States Patent

Asai et al.

[11] Patent Number: 5,997,373
[45] Date of Patent: Dec. 7, 1999

[54] JET-PROPELLED BOAT

[75] Inventors: Masahiro Asai; Takeshi Wakabayashi; Takaharu Kurosaki, all of Saitama, Japan

[73] Assignee: Honda Giken Kogyo Kabushiki Kaisha, Tokyo, Japan

[21] Appl. No.: 09/053,027

[22] Filed: Apr. 1, 1998

[30] Foreign Application Priority Data

Apr. 3, 1997 [JP] Japan .................................... 9-101020

[51] Int. Cl.⁶ ................................................ B63H 21/32
[52] U.S. Cl. ................................ 440/89; 440/1; 440/38; 60/324
[58] Field of Search ........................ 60/310, 313, 324; 440/1, 2, 47, 38, 88, 89

[56] References Cited

U.S. PATENT DOCUMENTS

| | | | |
|---|---|---|---|
| 4,912,930 | 4/1990 | Ueda | 60/324 |
| 4,999,999 | 3/1991 | Takahashi et al. | 60/324 |
| 5,244,425 | 9/1993 | Tasaki et al. | 440/47 |

FOREIGN PATENT DOCUMENTS

| | | |
|---|---|---|
| 56-56915 | 5/1981 | Japan . |
| 62-35013 | 2/1987 | Japan . |
| 62-59194 | 3/1987 | Japan . |
| 2-36129 | 8/1987 | Japan . |
| 5-27270 | 4/1993 | Japan . |
| 5-246385 | 9/1993 | Japan . |
| 7-71279 | 3/1995 | Japan . |
| 7-180556 | 7/1995 | Japan . |

*Primary Examiner*—Ed Swinehart
*Attorney, Agent, or Firm*—Birch, Stewart, Kolasch & Birch, LLP

[57] ABSTRACT

The expected performance of a jet-propelled boat is maintained, exhaust control valves are controlled and driven in an improved accuracy on the basis of the traveling speed of the jet-propelled boat. Thus, the fuel consumption is improved and the exhaust gas is purified. A two-stroke cycle engine drives a jet propulsion unit to make the jet propulsion unit suck in water and jet water therefrom to propel a hull of the boat. An exhaust control valve is disposed near the exhaust port of the engine to change the opening ratio of the exhaust port according to the operating condition of the engine. A driving mechanism for driving the exhaust control valve includes a hydraulic actuator. The power of water jetted by the jet propulsion unit represents the traveling speed of the jet-propelled boat accurately. The exhaust control valve is driven for opening and closing according to the pressure of water jetted by the jet propulsion unit to achieve the optimum exhaust control by the exhaust control valve without entailing an excessive increase in the output of the engine.

16 Claims, 4 Drawing Sheets

JET-PROPELLED BOAT

BACKGROUND OF THE INVENTION

1. Field of the Invention

The present invention relates to a jet-propelled boat in which pressure is applied to water by a jet propulsion unit driven by a two-stroke cycle engine to jet water for propelling a hull of the boat. More particularly, to a valve driving mechanism for driving an exhaust control valve installed on the two-stroke cycle engine.

2. Description of Related Art

A jet-propelled boat as mentioned in, for example, JP-A No. 62-35013 and JP-U No. 5-27270, is a small ship in which an operator straddles a saddle type seat. Such a jet-propelled boat provided with a saddle type seat is used as a recreational boat or a rescue boat owing to its sharp steering characteristic and high mobility. Jet propulsion units for a jet-propelled boat mentioned in, for example, JP-A Nos. 62-59194 and 5-246385 have an impeller driven for rotation by an engine, water is sucked from outside the boat, pressurized and jetted by the rotation of the impeller to propel the boat. The jet propulsion unit mentioned in the former cited reference takes pressurized water from the downstream side of the impeller and uses the water as cooling water for cooling the engine. The jet propulsion unit mentioned in the latter cited reference takes pressurized water from the downstream side of the impeller and uses the water as cooling water for cooling a bearing unit supporting the impeller.

As is generally known, a two-stroke cycle engine has a relatively simple construction and is capable of providing a high power output for its size. As mentioned in, for example, JP-A Nos. 56-56915 and 56-60817, such a two-stroke cycle engine is provided with an exhaust control valve for varying exhaust timing on the inner surface of an exhaust passage at a position near the upper edge of an exhaust port. The exhaust control valve is opened to advance the time to start discharging an exhaust gas so that scavenging is promoted while the engine is operating at a high engine speed and the exhaust control valve is half closed to delay the time to start discharging an exhaust gas so that the blowby of a new charge is prevented while the engine is operating at a low engine speed to enhance the output power of the engine and to improve the fuel consumption of the engine.

A two-stroke cycle engine may change the exhaust timing thereof by driving an exhaust control valve by the pressure of engine cooling water increasing with the increase of engine speed.

In two-stroke cycle engines disclosed in JP-A Nos. 7-71279 and 7-180556, an exhaust control valve for opening and closing an exhaust port is disposed on the inner surface of an exhaust passage at a position near the upper edge of the exhaust port, the exhaust port is substantially fullly closed by the exhaust control valve while the two-stroke cycle engine is operating in a low-speed, low-load operation to control the pressure in the cylinder properly, to activate a new charge charged into the combustion chamber by the thermal energy of a combustion gas remaining in the combustion chamber and to make self-ignition combustion in an activation heat atmosphere so that the fuel consumption of the engine is improved and the exhaust gas is purified. Traveling speed, and engine speed and throttle opening representing load on the engine are measured, engine output power is estimated on the basis of a measured traveling speed, a measured engine speed and a measured throttle opening, the exhaust control valve is opened to increase the ratio of exhaust opening while the engine is operating at a high engine speed under a high load, and the exhaust control valve is closed to close the exhaust port while the engine is operating at a low engine speed under a low load.

SUMMARY AND OBJECTS OF THE INVENTION

It is desired to install a two-stroke cycle engine capable of providing a high output power for its size on a jet-propelled boat which is required to have a sharp steering characteristic and high mobility, and it is desired that the two-stroke cycle engine is provided with an exhaust control valve to improve fuel consumption and to purify the exhaust gas.

If the exhaust control valve is driven according to the engine speed and throttle opening by a servomotor to meet such requirements, additional sensors and parts for an electric control system are necessary and those additional sensors and parts increase the cost. This results in an increase in the complexity and the dimensions of the construction. A jet-propelled boat, in particular, requires that a compact power unit including an engine is installed neatly in a hull to realize an expected mobility. If a large driving mechanism is necessary for driving the exhaust control valve, the jet-propelled boat is unable to exercise its original performance.

If a driving method using the pressure of the engine cooling water for driving the exhaust control valve is employed instead of the driving method employing a servomotor for driving the exhaust control valve, an increase in the parts of an electric control system can be avoided and a compact power unit can be neatly installed in the hull. However, whereas the traveling speed of a vehicle which is used on land is substantially proportional to the engine output, the traveling speed of a jet-propelled boat which travels on the water varies following the variation of engine output estimated on the basis of engine speed with a considerable delay. Therefore, if the exhaust control valve is driven after estimating the traveling speed of the jet-propelled boat simply on the basis of engine speed, it is possible that the ratio of the exhaust opening is increased to increase engine output excessively while the engine is operating at a low engine speed under a low load.

Furthermore, if water taken from outside the jet-propelled boat is supplied to a hydraulic actuator, such as a cylinder actuator to drive the exhaust control valve by the hydraulic actuator when the jet-propelled boat is used on the sea, a lake or a swamp, measures must be taken to prevent the hydraulic actuator from being clogged with water weeds or trash contained in water supplied to the hydraulic actuator. In addition, measures must be taken to prevent malfunctioning.

Still further, if a multiple cylinder two-stroke cycle engine is employed, a driving mechanism for driving the exhaust control valve must be constructed as compact as possible to enable the jet-propelled boat to exercise its expected mobility.

The present invention has been made in view of the foregoing problems in the prior art and it is therefore an object of the present invention to provide a jet-propelled boat capable of exercising expected improved performance by driving and controlling an exhaust control valve on the basis of accurate traveling speed.

Another object of the present invention is to prevent a hydraulic actuator for controlling an exhaust control valve from malfunctioning.

A third object of the present invention is to provide a compact exhaust control valve driving mechanism for a multiple cylinder two-stroke cycle engine.

In a jet-propelled boat in accordance with the present invention, a hull is propelled by driving a jet propulsion unit by using a two-stroke cycle engine to suck and jet water by the jet propulsion unit. An exhaust control valve varies the ratio of exhaust opening according to the operating condition of the engine and is disposed near an exhaust port of the engine. The exhaust control valve is driven for opening and closing by an exhaust control valve driving mechanism including a hydraulic actuator driven by water jetted by the jet propulsion unit.

The exhaust control valve of the two-stroke cycle engine included in the jet-propelled boat can be driven without requiring additional parts for an electric control system, such as a servomotor. The power of water jetted by the jet propulsion unit represents the output of the engine more accurately than engine speed. The exhaust control valve is driven for opening and closing according to the pressure of water jetted by the jet propulsion unit to achieve an optimum exhaust control by the exhaust control valve without entailing an excessive increase in the output of the engine.

When applying the present invention to a two-stroke cycle engine which makes combustion in an activation heat atmosphere, the exhaust control valve is forcibly maintained in a substantially fully closed state, and the hydraulic actuator is made to function to open the exhaust control valve according to the pressure of water jetted by the jet propulsion mechanism. The present invention is applicable also to a two-stroke cycle engine which simply changes exhaust timing and does not perform combustion in an activation heat atmosphere.

In the jet-propelled boat in accordance with the present invention, the hydraulic actuator for driving the exhaust control valve comprises a cylinder provided with an inlet for receiving water jetted by the jet propulsion unit and an outlet through which water is discharged, a piston sidably fitted in the cylinder, and a return spring for biasing the piston against the power of water supplied into the cylinder. When the present invention is applied to combustion in an activation heat atmosphere, the exhaust control valve connected to the piston is kept in a substantially fully closed state by the return spring, and the exhaust control valve is driven for opening by the pressure of water supplied by the jet propulsion unit into the cylinder.

Water supplied by the jet propulsion unit always flows through the cylinder, the cylinder will not be clogged with water weeds even if water taken from outside the boat is used, and the cylinder mechanism can be maintained always in a satisfactory operating state.

The jet-propelled boat of the present invention may be furnished with a multiple cylinder two-stroke cycle engine provided with a plurality of cylinders in a parallel arrangement. An exhaust control valve disposed, respectively, near the exhaust ports of the cylinders are mounted on a common shaft for a swinging motion, and the common shaft is driven for turning by a hydraulic actuator to drive the exhaust control valves for opening and closing.

Thus, all the exhaust control valves are driven by the single hydraulic actuator, and the exhaust control valves for all the cylinders are operated by a single driving mechanism to form the driving mechanism in a compact construction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A jet-propelled boat in a preferred embodiment according to the present invention will be described with reference to the accompanying drawings.

Figure 1:
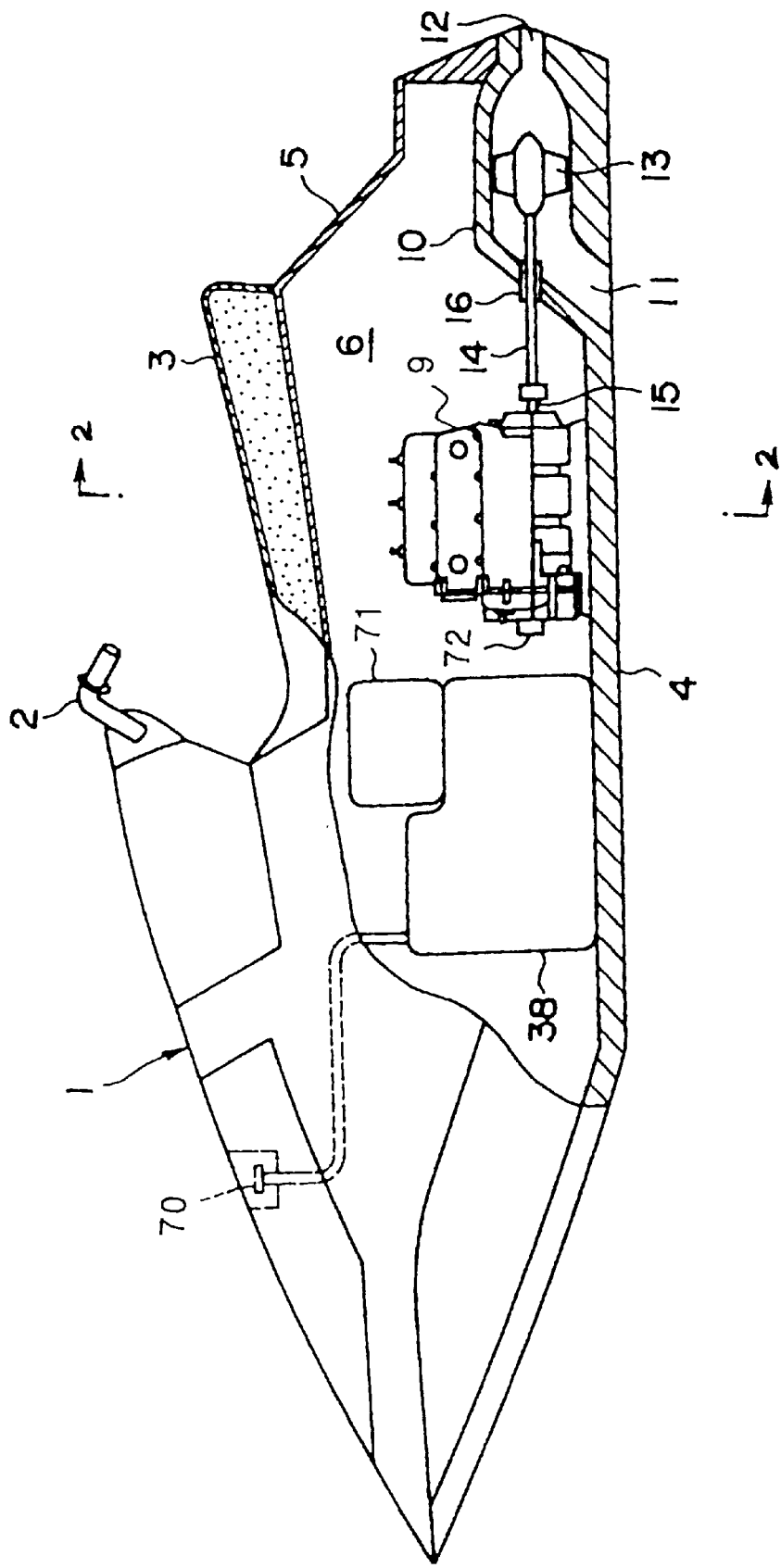
FIG. 1 is a partly cutaway side view of a jet-propelled boat in a preferred embodiment according to the present invention.
Figure 2:
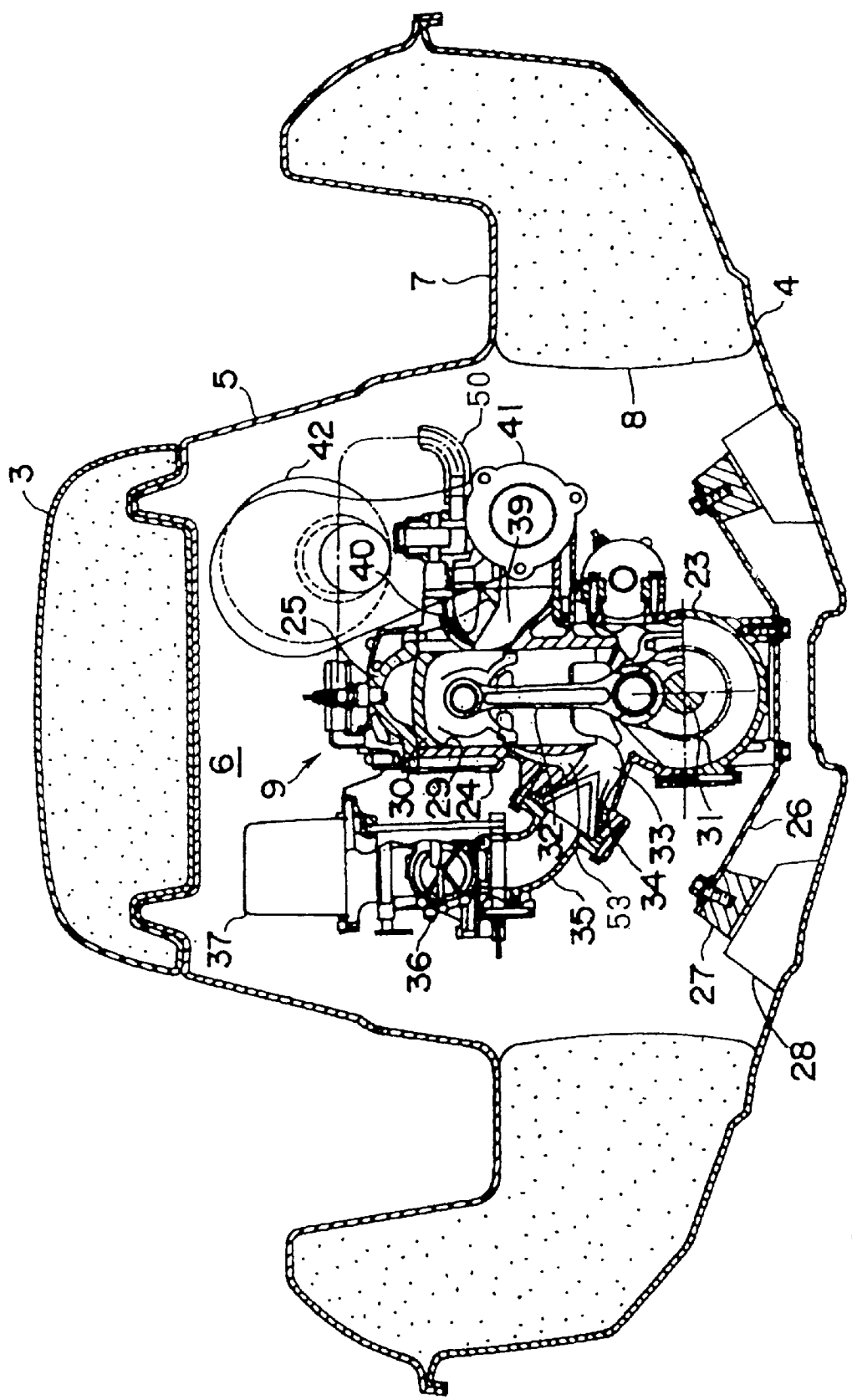
FIG. 2 is a sectional view taken on line 2—2 in FIG. 1.

Referring to FIGS. 1 and 2, a hull 1 is provided with a steering handlebar 2 in its substantially middle portion and a saddle type seat 3 is disposed behind the steering handlebar 2. An operator straddles on the seat 3 with his or her feet put on steps as shown in FIG. 2 and operates the steering handlebar 2 to steer the jet propelled boat.

The hull 1 is a buoyant structure constructed by joining together a lower panel 4 and an upper panel 5, and having an internal space 6. The lower panel 4 and the upper panel 5 are made from a FRP (fiber-reinforced plastic) or the like. Steps 7 are formed in portions of the upper panel 5 on the opposite sides of the seat 3. Portions of the space 6 under the steps 7 are filled up with buoyant flotation blocks 8.

A power unit including an engine 9 is installed in the space 6 of the hull 1. From the viewpoint of the position of the center of gravity of the hull to secure satisfactory steerability, and the positional relation between the engine 9 and a jet propulsion unit 10 disposed in a rear end portion of the hull, the engine 9 is disposed in a portion of the space 6 under the seat 3.

The jet propulsion unit 10 has a duct having an inlet 11 opening in the bottom of the hull and a jet nozzle 12 opening in the rear end of the hull, an impeller 13 supported for rotation in the duct, and a drive shaft 14 supporting the impeller 13 and connected to the output shaft 15 of the engine 9. As shown in FIG. 1, the drive shaft 14 is supported for rotation in a water-tight sealing member 16.

When the impeller 13 is driven for rotation by the engine 9, water is taken through the inlet 11 into the duct and is jetted through the jet nozzle 12 to propel the hull 1 forward.

Figure 3:
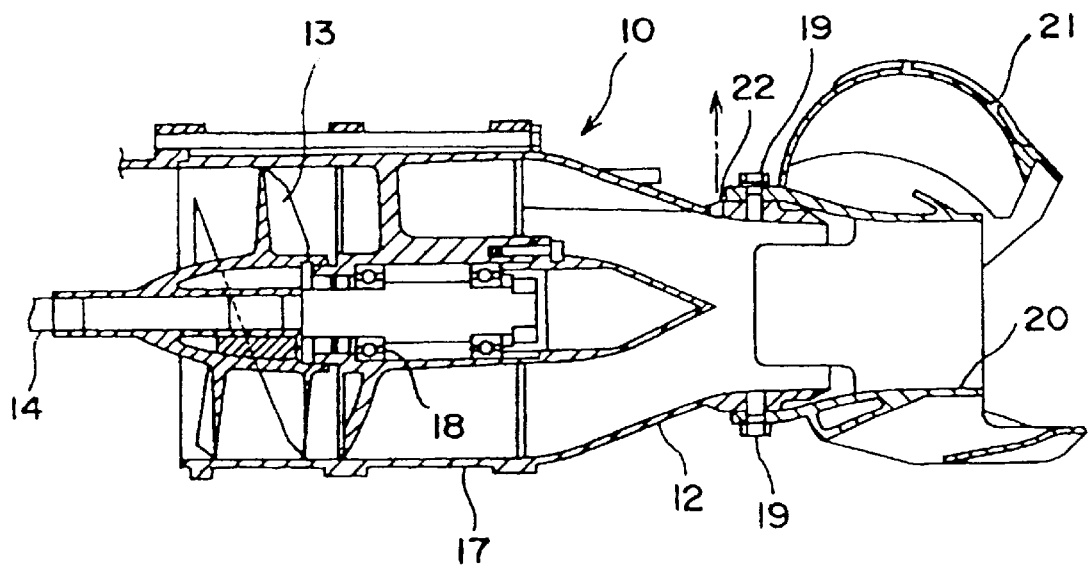
FIG. 3 is a sectional side view of a jet propulsion unit included in the preferred embodiment of the present invention.

The jet propulsion unit 10 will be described in detail. As shown in FIG. 3, the impeller 13 is supported for rotation by bearings 18 in a tubular impeller housing 17. The jet nozzle 12 is tapered rearwardly and is connected to the rear end of the impeller housing 17. The impeller housing 17 serves as the duct through which water taken through the inlet 11 flows toward the jet nozzle 12.

A steering nozzle 20 is supported for swing motion in a horizontal plane by pivot pins 19 on a rear end portion of the jet nozzle 12. The steering nozzle 20 is connected by a wire mechanism, not shown, to the steering handlebar 2. The steering nozzle 20 is turned to the right or to the left by operating the steering handlebar 2 to control the water jetting direction so as to change the traveling direction of the jet-propelled boat.

A cup-shaped reverser 21 is support for turning in a vertical plane on the steering nozzle 20. When the reverser 21 is turned downward to set the reverser 21 opposite to the steering nozzle 20, the flowing direction of water currents jetted through the steering nozzle 20 is reversed substantially through an angle of 180 degrees so that the jet-propelled boat is reversed.

An intake port 22 is formed in a throat of the jet nozzle 12 where the pressure of the water jet reaches a maximum to take part of the water pressurized by the rotating impeller 13 through the intake port 22. Since the flow rate of the water taken through the intake port 22 is substantially proportional to the flow rate of a water jet substantially corresponding to the traveling speed of the jet-propelled boat, water taken through the intake port 22 is used for controlling the driving of an exhaust control valve, which will be described later.

The engine 9 is a two-stroke cycle engine having three cylinders arranged in parallel to a crankshaft extended in parallel to the longitudinal axis of the hull 1. The engine 9 is installed in a portion having a cross section of a shape resembling an inverted pyramid of the space 6 under the seat 3 with the axes of the cylinders directed towards the apex of the inverted pyramids on the center of the bottom of the hull.

The engine 9 has a crankcase 23, a cylinder block 24 and a cylinder head 25, which are stacked in that order and joined together. The crankcase 23 is mounted on an engine hanger 26, and the engine hanger 26 is fastened to mounting blocks 27 mounted on bosses 28 formed on the lower panel 4 of the hull 1.

Pistons 30 are slidably fitted in three cylinder bores 29 formed in the cylinder block 24 of the engine 9. Each piston 30 is connected by a connecting rod 32 to the crankshaft 31. The pistons 30 move axially in the cylinder bores 29 to rotate the crankshaft 31, the output torque of the crankshaft 31 is provided on an output shaft 15 to drive the impeller 13 for rotation.

Suction ports 33 provided in one side wall (a left side wall as viewed in FIG. 2) are formed so as to correspond to the cylinders. Reed valves 34 are placed in the suction ports 33, respectively. The suction ports 33 are connected by suction pipes 35 to a carburetor 36. An air cleaner 37 is connected to the inlet side of the carburetor 36. Fuel is supplied from a fuel tank 38 to the carburetor 36.

A throttle lever, not shown, supported on the steering handlebar 2 is operated to adjust the opening of a throttle valve, air sucked through the air cleaner 37 is mixed with fuel by the carburetor 36 to produce a mixture, and the mixture is supplied through the reed valve 34 and the suction port 33 into the crankcase 23.

Exhaust ports 39 are formed in the other side wall (a right side wall as viewed in FIG. 2) are formed so as to correspond to the cylinders, and exhaust control valve 40 are placed in the exhaust ports 39, receptively. Each of the exhaust control valves 40 is supported for swinging motion at a position near an exhaust port opening into the cylinder bore and is turned according to the traveling speed of the jet-propelled boat by a hydraulic actuator, which will be described later. Thus, the exhaust control valve 40 regulates the open area of the exhaust port 39 so that the exhaust port 39 is opened at an optimum opening ratio of the exhaust port according to the operating condition of the jet-propelled boat; the exhaust control valve 40 closes the exhaust port 39 while the engine 9 is operating at a low engine speed under a low load to achieve active thermal atmosphere combustion, to improve fuel consumption and to purify the exhaust gas.

Each exhaust port 39 is connected to an exhaust manifold 41. The exhaust manifold 41 is connected to an exhaust chamber 42. A muffler, not shown, held in a rear end portion of the hull is connected to the exhaust chamber 42. The exhaust gas discharged through the exhaust port 39 is discharged through the exhaust manifold 41 the exhaust chamber 42, the muffler and an exhaust opening, not shown, outside the hull 1.

In this embodiment, the exhaust manifold 41 opens towards the front of the hull 1 (to the left as viewed in FIG. 1), and the front end of the exhaust chamber 42 is joined to the open end of the exhaust manifold 41. The exhaust chamber 42 is bent upwardly in a curve through an angle of 1800 so that a rear portion thereof extends rearwardly, and the muffler is connected to the rear end of the exhaust chamber 42.

Figure 4:
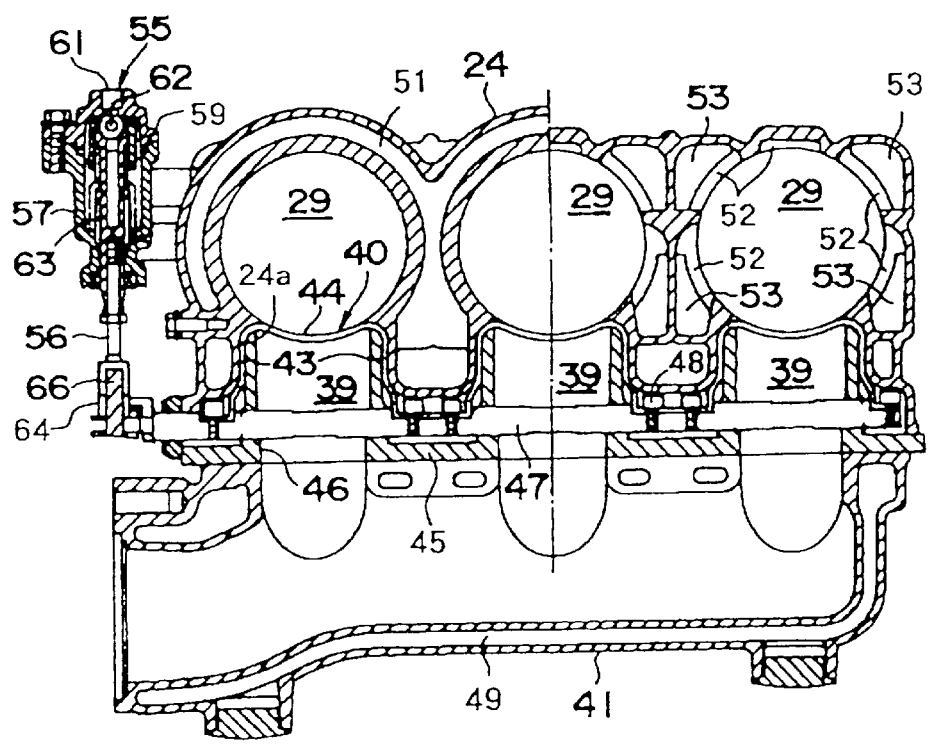
FIG. 4 is a sectional plan view of an engine included in the preferred embodiment of the present invention.

Referring to FIG. 4 showing the engine 9 in a sectional view, the exhaust control valve 40 has a pair of substantially sectoral arms 43, and a valve element 44 having a cross section resembling a circular arc. The exhaust control valve 40 is received in a recess 24a having a longitudinal section resembling a circular arc and formed in an upper edge portion of the exhaust port of the cylinder block 24. A bracket 45 for supporting the exhaust control valves is interposed between the cylinder block 24 and the exhaust manifold 41. The bracket 45 is provided with through holes 46 by means of which the exhaust ports 39 communicate with the exhaust manifold 41. A shaft 47 extending along all the cylinders is supported for rotation on the bracket 45, and the respective base ends of the sectoral arms 43 are fastened to the shaft 47 with screws 48.

The shaft 47 supporting the exhaust control valves 40 is turned about its axis to open or close the exhaust control valves 40 to vary the ratio of the opening of the exhaust ports 39 between a ratio corresponding to a fully closed state and a ratio corresponding to a fully open state.

As shown in FIG. 2, an exhaust passage extendes downwardly from each exhaust port 39 towards the exhaust manifold 41 so as to avoid the upper edge of the exhaust port 39. Therefore, the shaft 47 can be extended across the axes of the exhaust ports 39. Accordingly, the shaft 47 can be used for supporting all the exhaust control valves 40, which simplifies a support mechanism for supporting the exhaust control valves 40 and facilitates work for assembling the engine 9.

As shown in FIG. 4, the exhaust manifold 41 is provided with a water jacket 49 for cooling water, and the cylinder block 24 is provided with a water jacket 51 connected by a pipe 50 to the water jacket 49. Cooling water flows through the water jackets 49 and 50.

Five scavenging ports 52 are formed in an upper portion of each cylinder bore 29. The scavenging ports 52 are connected by scavenging passages 53 vertically extending through the cylinder block 24 to the interior of the crankcase 23.

The mixture supplied into the crankcase 23 is compressed by the piston 30 moving downwardly, the compressed mixture flows through the scavenging passages 53 and the scavenging ports 52 into a combustion chamber formed in each cylinder for scavenging.

Figure 5:
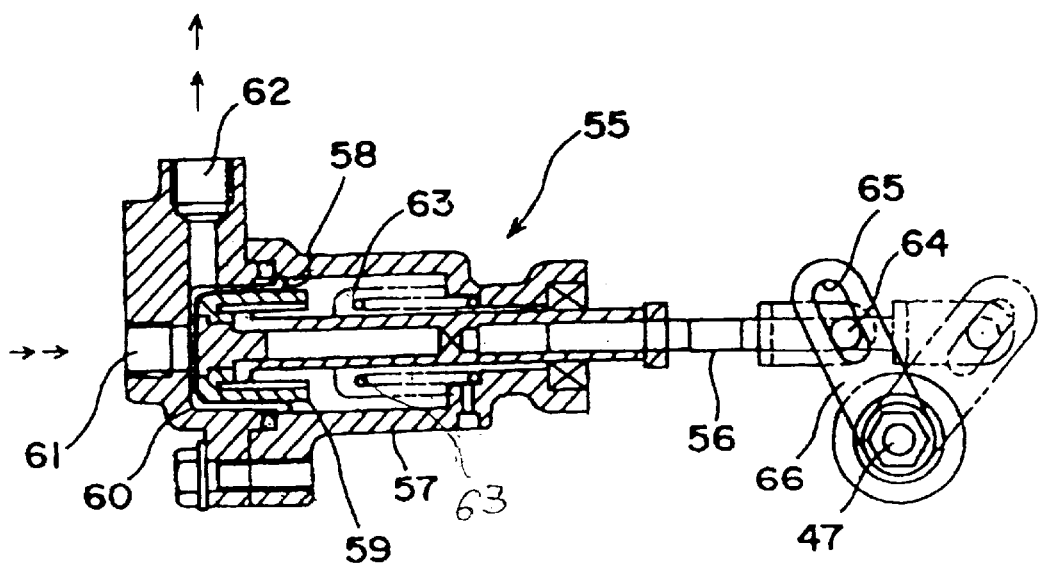
FIG. 5 is a sectional side view of a hydraulic actuator included in the preferred embodiment of the present invention.

As shown in FIGS. 4 and 5, a hydraulic cylinder actuator 55 is held on the outer side wall of the cylinder block 24. The free end of the piston rod 56 of the cylinder actuator 55 is connected to the shaft 47 for operating the exhaust control valves.

The cylinder actuator 55 has a cylinder 57, a diaphragm 58 placed in the cylinder 57, and a piston 59 axially slidably inserted in the cylinder 57. The piston rod 56 connected to the piston 59 projects outwardly from the cylinder 57.

The cylinder 57 is provided with an inlet port 61 through which a fluid is supplied into a pressure chamber 60 in which the pressure receiving surface of the piston 59 is exposed, and an outlet port 62 through which the fluid is discharged from the pressure chamber 60. A return spring 63 is placed in the cylinder 57 to bias the piston 59 continuously against the pressure of the fluid supplied into the pressure chamber 60. If the pressure in the pressure chamber 60 increases beyond a predetermined level, the piston 59 is moved against the force of the return spring 63, so that the piston rod 56 is further projects from the cylinder 57. If the pressure in the pressure chamber 60 decreases below the predetermined level, the piston rod 56 is retracted by the force of the return spring 63.

In this embodiment, the fluid flows through the inlet port 61 into the pressure chamber 60 and flows outside through the outlet port 62. Therefore water weeds or trash contained in the fluid is discharged instantly and hence the cylinder actuator 55 will not malfunction.

A pin 64 is attached to the free end of the piston rod 56 so as to project laterally, and a lever 66 provided with a slot 65 is fixedly attached to an end portion of the shaft 47. The pin 64 of the piston rod 56 is inserted in the slot 65 of the lever 66 to turn the shaft 47 through the lever 66 when the piston rod 56 is moved.

If the pressure in the pressure chamber 60 increases beyond the predetermined level and the piston rod 56 is further projects from the cylinder 57, the lever 66 is turned clockwise, as viewed in FIG. 5, so that the exhaust control valve 40 opens the exhaust port 39 at an opening ratio of 100%. If the pressure in the pressure chamber 60 decreases below the predetermined level and the piston rod 56 is retracted, the lever 66 is turned counterclockwise, as viewed in FIG. 5, and the exhaust control valve 40 closes the exhaust port 39 substantially fully.

Figure 6:
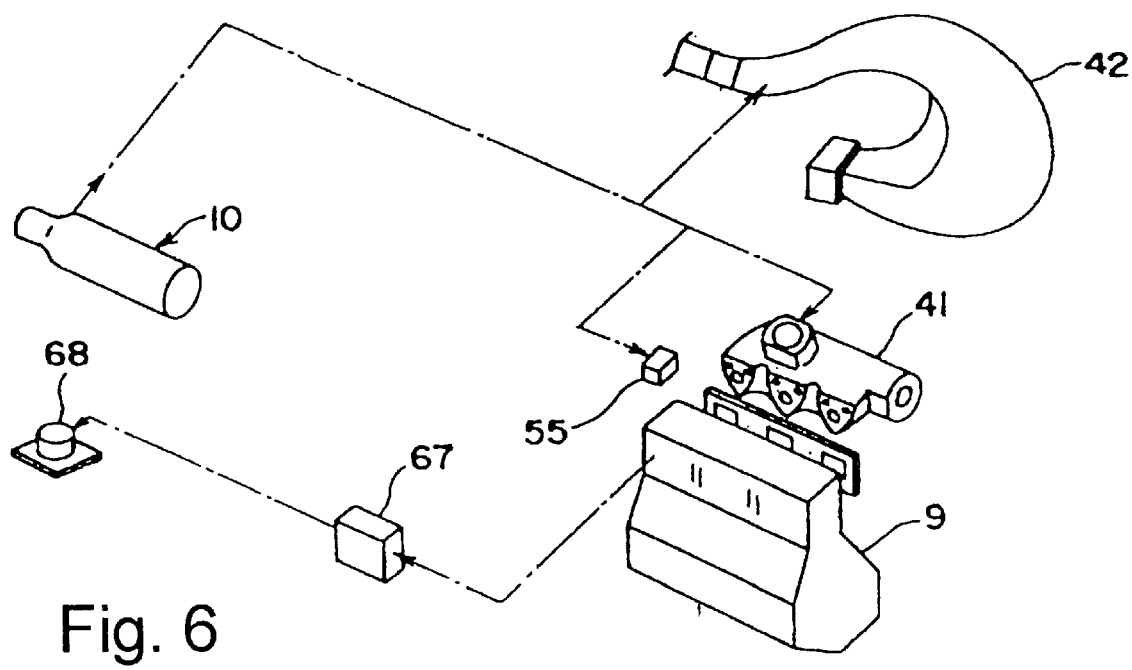
FIG. 6 is a perspective view of a pressurized water supply system included in the preferred embodiment of the present invention.

As shown in FIG. 6, pressurized water taken through the intake port 22 formed in the jet nozzle 19 of the jet propulsion unit 10 is supplied into the pressure chamber 60 of the cylinder actuator 55. If the pressure of the pressurized water increases as the rotating speed of the impeller 13 increases, the exhaust control valve 40 is turned in an opening direction to open the exhaust port 39 at an opening ratio of 100%. In a state where the rotating speed of the impeller 13 is not very high, i.e., in a low-speed, low-load state, the pressure of water supplied into the pressure chamber 60 is not very high, the exhaust control valve 40 is turned in a closing direction by the resilience of the return spring 63 to close the exhaust port 39 substantially fully to create a state for combustion in an activation heat atmosphere.

In this embodiment, part of the pressurized water taken from the jet propulsion unit 10 is made to flow through the exhaust manifold 41 and the engine 9 as cooling water, and is discharged outside through a thermocase 67 and a discharge opening 68 formed in the hull 1. In this embodiment, part of the pressurized water taken from the jet propulsion unit 10 is discharged into the exhaust chamber 42 to cool the exhaust chamber 42 and is discharged outside together with the exhaust gas.

In FIG. 1, a fuel lid 70 is provided that is opened when fuel is supplied to the fuel tank 38. In addition, a lubricating oil tank 71 is provided adjacent to the fuel tank 38. The two-stroke cycle engine 9 employed in this embodiment is of a separate lubrication system. An oil pump 72 mounted on the front end of the engine 9 is driven for rotation by the crankshaft 31 to supply the lubricating oil from the lubricating oil tank 71 to lubricated parts of the engine 9.

The jet-propelled boat thus constructed is controlled by an operator who straddles on the seat 3 with his or her feet resting on the steps 7 and operates the steering handlebar 2. Since the exhaust control valves 40 are driven by the pressure of water, the power unit to be installed in the space 6 of a limited size in the hull 1 can be formed in a compact construction, and the jet-propelled boat is able to display its expected mobility.

When the engine 9 is operating in the normal operating state other than a low-speed, low-load state, the exhaust control valve 40 is set by the pressurized water taken from the jet propulsion unit 10 so as to fully open the exhaust ports 39. The mixture supported through the suction port 33 of the engine 9 into the crankcase 23 is pressurized by the piston 30 moving downwardly, the pressurized mixture is supplied through the scavenging port 52 into the combustion chamber, the mixture is compressed in the combustion chamber by the piston 30 moving upward, the compressed mixture is ignited for combustion by an ignition plug, the combustion gas produced by combustion is exhausted and scavenged through the exhaust port 33 as the piston 30 moves downwardly. Thus, the engine 9 repeats the ordinary two-stroke cycle to drive the impeller 13 for rotation at a high rotating speed to supply water at a pressure not lower than the predetermined level to the cylinder actuator 55.

While the impeller 13 is rotating at a low rotating speed or while the engine is operating at an idling speed in a low-speed, low-load state, the pressure of water supplied to the cylinder actuator 55 is below the predetermined level. Consequently, the exhaust control valves 40 keep the exhaust ports 39 in a substantially fully closed state to maintain the operation of the engine 9 by combustion in an activation heat atmosphere.

If the traveling speed of the jet-propelled boat drops below a predetermined speed, the combustion in an activation heat atmosphere mode is established before the output of the engine 9 increases excessively to achieve the improvement of fuel consumption and to purify the exhaust gas while the engine is operating in a low-speed, low-load state.

Although the invention has been described as applied to the jet-propelled boat provided with the saddle type seat, the present invention does not place any restrictions on the type of the boat.

The present invention is applicable generally to two-stroke cycle engines provided with exhaust control valves regardless of the number of cylinders.

Although the foregoing embodiment employs the hydraulic cylinder actuator, the present invention may employ an actuator of any suitable type provided that the actuator is capable of converting the pressure of water into force for operating the exhaust control valves.

As is apparent from the foregoing description, according to the present invention, the pressure of water produced by the jet propulsion unit is used for driving the exhaust control valves of the two-stroke cycle engine for opening and closing the exhaust control valves. Therefore, the exhaust control valve driving mechanism can be formed in a compact construction at a low cost, the jet-propelled boat is able to display its expected performance, the exhaust control valves can be accurately controlled on the basis of the traveling speed of the jet-propelled boat, fuel consumption can be improved and the exhaust gas can be purified.

According to the present invention, water supplied from the jet propulsion unit flows through the hydraulic actuator. Therefore, the hydraulic actuator for driving the exhaust control valves are prevented from malfunctioning.

According to the present invention, the exhaust control valves of the multiple cylinder two-stroke cycle engine are attached to and operated by the common shaft. Therefore, the exhaust control valve driving mechanism can be formed in a compact construction at a low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A jet-propelled boat including a two-stroke cycle engine, and a jet propulsion unit driven by the two-stroke cycle engine to propel a hull of the boat by sucking water into an inlet and jetting water therefrom comprising:
   an exhaust port;
   an exhaust control valve for varying the ratio of an exhaust opening according to the operating condition of the engine, said exhaust control valve being operatively connected to said exhaust port; and
   a hydraulic actuator operated by water jetted by a jet propulsion unit to drive the exhaust control valve for opening and closing the exhaust control valve.

2. The jet-propelled boat according to claim 1, wherein the hydraulic actuator comprises a cylinder provided with an inlet port for receiving water therethrough from the jet propulsion unit and an outlet port for discharging water therethrough, a piston slidably fitted in the cylinder, and a return spring for biasing the piston against the water received into the cylinder, said piston being moved by the pressure of the water received from the jet propulsion unit and flowing through the cylinder to drive the exhaust control valve connected to the piston for opening and closing the exhaust control valve.

3. The jet-propelled boat according to claim 1, wherein the engine is a multiple cylinder engine provided with a plurality of cylinders arranged in a parallel disposition, the exhaust control valves disposed, respectively, near the exhaust ports of the cylinders are mounted on a common shaft for swinging motion, and the common shaft is driven for turning by the hydraulic actuator to drive the exhaust control valves for opening and closing the exhaust control valve.

4. The jet-propelled boat according to claim 2, wherein the engine is a multiple cylinder engine provided with a plurality of cylinders arranged in a parallel disposition, the exhaust control valves disposed, respectively, near the exhaust ports of the cylinders are mounted on a common shaft for swinging motion, and the common shaft is driven for turning by the hydraulic actuator to drive the exhaust control valves for opening and closing the exhaust control valve.

5. The jet-propelled boat according to claim 2, and further including a piston rod operatively connected to said piston and projecting from said hydraulic actuator, said piston rod being operatively connected to said exhaust control valve for imparting rotation thereto.

6. The jet-propelled boat according to claim 5, and further including a lever having a first end and a second end, said first end being secured adjacent to one end to a shaft operatively connected to said exhaust control valve and said second end including a slot for receiving a pin mounted on said piston rod, said pin and said slot convert the reciprocating motion of said piston and said piston rod to rotate said shaft for permitting rotation of said exhaust control valve.

7. The jet-propelled boat according to claim 2, and further including a diaphragm operatively mounted within said cylinder and being disposed adjacent to said piston for providing a fluid tight connection of said piston relative to said cylinder.

8. The jet-propelled boat according to claim 2, wherein said spring normally biases said piston to a closed position to prevent the flow of water through said cylinder.

9. A jet-propelled boat including a two-stroke cycle engine, and a jet propulsion unit driven by the two-stroke cycle engine to propel a hull of the boat by sucking water into an inlet and jetting water therefrom comprising:
   an exhaust port;
   an exhaust control valve operatively mounted relative to said exhaust port for selectively varying the ratio of an exhaust opening according to the operating condition of the engine; and
   an actuator responsive to water jetted by a jet propulsion unit for driving the exhaust control valve for selectively opening and closing the exhaust control valve in responsive to water jetted by the jet propulsion unit.

10. The jet-propelled boat according to claim 9, wherein the the actuator is a hydraulic actuator comprises a cylinder provided with an inlet port for receiving water therethrough from the jet propulsion unit and an outlet port for discharging water therethrough, a piston slidably fitted in the cylinder, and a return spring for biasing the piston against the water received into the cylinder, said piston being moved by the pressure of the water received from the jet propulsion unit and flowing through the cylinder to drive the exhaust control valve connected to the piston for opening and closing the exhaust control valve.

11. The jet-propelled boat according to claim 9, wherein the engine is a multiple cylinder engine provided with a plurality of cylinders arranged in a parallel disposition, the exhaust control valves disposed, respectively, near the exhaust ports of the cylinders are mounted on a common shaft for swinging motion, and the common shaft is driven for turning by the actuator to drive the exhaust control valves for opening and closing the exhaust control valve.

12. The jet-propelled boat according to claim 10, wherein the engine is a multiple cylinder engine provided with a plurality of cylinders arranged in a parallel disposition, the exhaust control valves disposed, respectively, near the exhaust ports of the cylinders are mounted on a common shaft for swinging motion, and the common shaft is driven for turning by the hydraulic actuator to drive the exhaust control valves for opening and closing the exhaust control valve.

13. The jet-propelled boat according to claim 10, and further including a piston rod operatively connected to said piston and projecting from said hydraulic actuator, said piston rod being operatively connected to said exhaust control valve for imparting rotation thereto.

14. The jet-propelled boat according to claim 13, and further including a lever having a first end and a second end, said first end being secured adjacent to one end to a shaft operatively connected to said exhaust control valve and said second end including a slot for receiving a pin mounted on said piston rod, said pin and said slot convert the reciprocating motion of said piston and said piston rod to rotate said shaft for permitting rotation of said exhaust control valve.

15. The jet-propelled boat according to claim 10, and further including a diaphragm operatively mounted within said cylinder and being disposed adjacent to said piston for providing a fluid tight connection of said piston relative to said cylinder.

16. The jet-propelled boat according to claim 10, wherein said spring normally biases said piston to a closed position to prevent the flow of water through said cylinder.

* * * * *